United States Patent
Jones et al.

(10) Patent No.: US 8,768,322 B2
(45) Date of Patent: Jul. 1, 2014

(54) METHOD AND SYSTEM FOR TRIGGERING EVENTS IN A RADIO NETWORK

(75) Inventors: Bryce A. Jones, Overland Park, KS (US); Jason R. Delker, Olathe, KS (US); John M. Everson, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 2477 days.

(21) Appl. No.: 10/779,261

(22) Filed: Feb. 13, 2004

(65) Prior Publication Data

US 2005/0181779 A1 Aug. 18, 2005

(51) Int. Cl.
*H04M 3/00* (2006.01)

(52) U.S. Cl.
USPC ......... 455/418; 455/41.2; 455/41.3; 455/419; 455/420; 455/436; 455/437; 455/438; 455/439; 455/444; 455/552.1; 455/553.1; 370/310.2; 370/328; 370/338

(58) Field of Classification Search
USPC ............ 455/432.1, 435.1, 422.1, 456.1, 41.2, 455/41.3, 552.1, 553.1, 436–444, 418–420, 455/310.2, 328, 338, 446
See application file for complete search history.

(56) References Cited

U.S. PATENT DOCUMENTS

| | | | | |
|---|---|---|---|---|
| 5,170,485 A | * | 12/1992 | Levine et al. ................ | 455/437 |
| 5,737,703 A | | 4/1998 | Byrne ........................... | 455/442 |
| 5,815,811 A | * | 9/1998 | Pinard et al. ................. | 455/434 |
| 6,052,598 A | * | 4/2000 | Rudrapatna et al. ........ | 455/456.1 |
| 6,061,337 A | * | 5/2000 | Light et al. ................... | 370/331 |
| 6,243,581 B1 | * | 6/2001 | Jawanda ...................... | 455/432.2 |
| 6,438,117 B1 | * | 8/2002 | Grilli et al. ................... | 370/331 |
| 6,680,923 B1 | | 1/2004 | Leon ............................. | 370/328 |
| 6,757,553 B1 | * | 6/2004 | English ........................ | 455/562.1 |
| 6,826,154 B2 | * | 11/2004 | Subbiah et al. ............... | 370/236 |
| 7,009,952 B1 | * | 3/2006 | Razavilar et al. ............. | 370/331 |
| 7,149,521 B2 | * | 12/2006 | Sundar et al. ............... | 455/435.1 |
| 2001/0036830 A1 | | 11/2001 | Wu et al. ....................... | 455/436 |
| 2003/0091021 A1 | | 5/2003 | Trossen et al. ............... | 370/349 |
| 2003/0207683 A1 | * | 11/2003 | Lempio et al. ............. | 455/422.1 |
| 2004/0105434 A1 | * | 6/2004 | Baw ............................. | 370/355 |
| 2004/0192294 A1 | * | 9/2004 | Pan et al. ..................... | 455/432.1 |
| 2005/0020256 A1 | * | 1/2005 | Peikari ........................ | 455/422.1 |
| 2005/0048972 A1 | * | 3/2005 | Dorenbosch et al. ......... | 455/436 |

OTHER PUBLICATIONS

Howard W. Sams & Co., Inc., Reference Data for Radio Engineers ch. 25 (5th ed. 1968).*
International Search Report in PCT/US04/21226, mailed Nov. 29, 2005.
Written Opinion in PCT/US04/21226, mailed Nov. 29, 2005.

* cited by examiner

Primary Examiner — Steve D Agosta

(57) ABSTRACT

A mobile station communicating with a first radio network, such as a WLAN, may detect that it is communicating with an access point located at a perimeter of a coverage area of the first radio network rather than communicating with an access point located within an interior of the coverage area. The mobile station might further detect one or both of first and second directional signals transmitted from the access point. In response, the mobile station might perform one or more predetermined actions, such as checking the availability of a radio network other than the WLAN, performing a handoff, sounding an alarm or some other action.

10 Claims, 10 Drawing Sheets

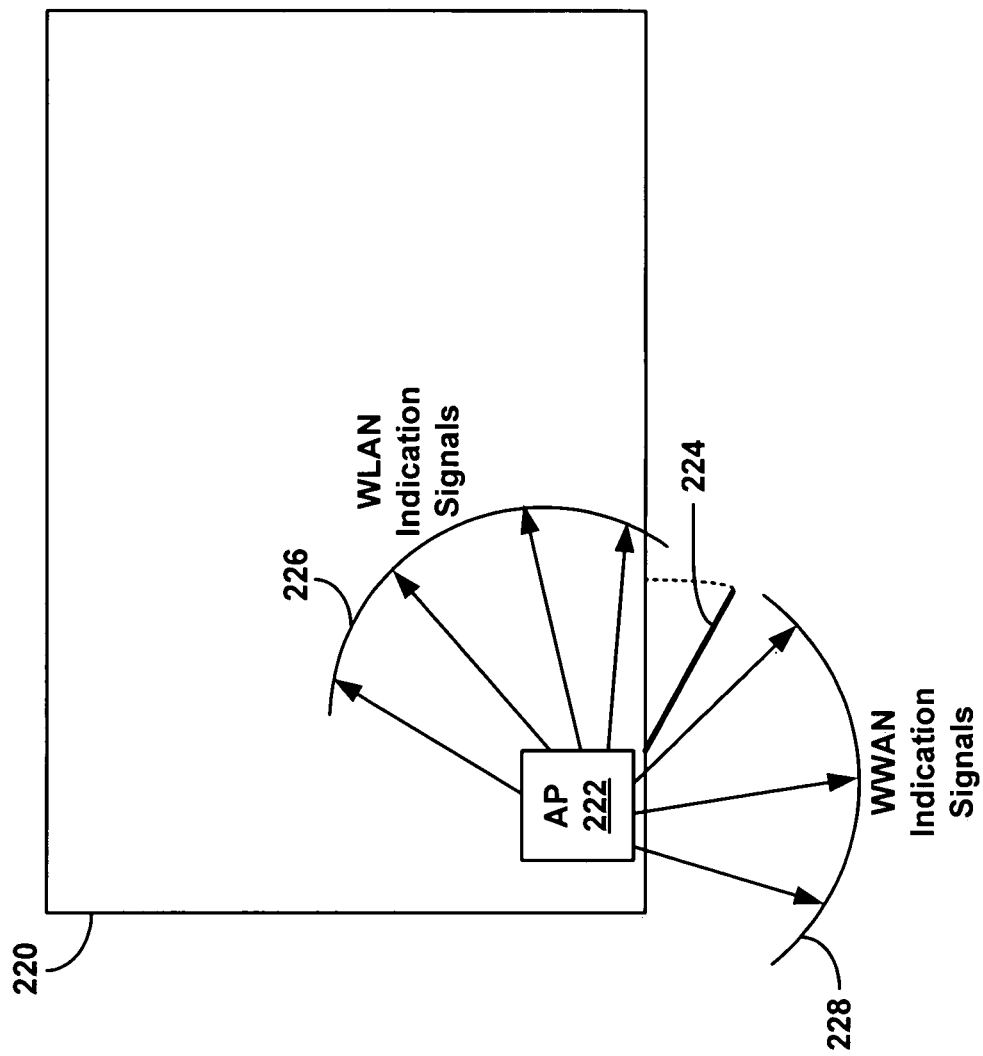

METHOD AND SYSTEM FOR TRIGGERING EVENTS IN A RADIO NETWORK

FIELD OF THE INVENTION

This invention relates generally to radio networks. More specifically it relates to a method and system for triggering events in a radio network.

BACKGROUND OF THE INVENTION

A mobile station may communicate with a first radio network, such as a wireless local area network ("WLAN") that uses one of the various Institute of Electrical and Electronics Engineers ("IEEE") 802.11 protocols. The mobile station may communicate with other devices on the first radio network. The first radio network may additionally provide connectivity to one or more other networks, such as packet data networks, thereby allowing the mobile station to also communicate with devices on those other networks.

In addition to the first radio network, the mobile station may also communicate with a second radio network, such as a wireless wide area network ("WWAN"). The mobile station may connect to the second radio network and then communicate with other devices on the second radio network. The second radio network may additionally provide connectivity to other networks, such as packet data networks. The mobile station may then also communicate with devices on those other networks.

The mobile station may communicate with one or both of the radio networks, which can provide the mobile station with voice, data or other services. Although both radio networks may provide the mobile station with one or more of these services, one radio network may provide the mobile station with higher data speeds or lower access charges that make communicating with that network preferable. Therefore, even when the mobile station is communicating with one of the radio networks, it might still be preferable for the mobile station to determine the availability of the other radio network and then switch to communicating with that radio network.

Further, the first and second radio networks may have different coverage areas, thereby potentially creating areas where the mobile station might only be able to access one of the radio networks. For example, as the mobile station changes location, it may leave the coverage area of one of the radio networks and then only be in the coverage area of the other radio network. If the mobile station were not already communicating with the other radio network, it might be advantageous for the mobile station to detect that radio network's availability and to begin communicating with that radio network.

Current methods for detecting the availability of a radio network have various limitations. In one method of detecting the availability of a radio network, a user of the mobile station manually prompts the mobile station to check the availability of the radio network, such as in response to a command from the user. This can disadvantageously create a delay in detecting the availability of the radio network, because while the mobile station may be within range of the radio network, the mobile station would only detect the radio network if it receives the command from the user. A delay in making the request would cause a delay in detecting the radio network's availability, and if the user did not even make a request, then the mobile station would not ever detect the radio network's availability and may lose existing radio network connectivity.

In another method of detecting the availability of the radio network, the mobile station might automatically check for the radio network's availability at predetermined time intervals. The mobile station might communicate with the radio network using a radio or other transceiver, which the mobile station can power-up and then use to check the radio network's availability. If the radio network is not available, then the mobile station might power-down the radio until the next predetermined interval when it again check the radio network's availability. Powering-up and powering-down the radio in this manner consumes battery power, which can be undesirable for battery-powered mobile stations. Similarly, continually leaving the radio on rather than periodically turning it on and off also consumes battery power and therefore may be undesirable.

Therefore, there exists a need for other methods for triggering a mobile station to perform predetermined actions, such as checking the availability of a radio network.

SUMMARY OF THE INVENTION

A mobile station communicating with a first radio network may use the availability of certain access points for the first radio network as an aid in determining when to perform one or more predetermined actions, such as checking for the availability of another radio network, performing a handoff, triggering an alarm or some other action. For example, some of the access points may be located within an interior of a coverage area of the first radio network, while other access points may be located at the perimeter of the coverage area of the first radio network. The mobile station might use the perimeter access points or in combination with other information in the headers of packets to trigger the mobile station to perform one or more predetermined actions.

In one embodiment, the first radio network may be a WLAN, and the second radio network may be a WWAN. The WLAN may include one or more access points located at the perimeter of a coverage area of the WLAN, and it may also include one or more access points located in the interior of the coverage area of the WLAN. The access points at the perimeter of the coverage area may broadcast two or more different signals, and the signals may be directional signals. For example, the access points may broadcast one signal toward the interior of the coverage area of the WLAN and a different signal toward the exterior of the coverage area of the WLAN. The mobile station might then use the different signals as a trigger to perform one or more predetermined actions.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which:

FIG. 5D is a block diagram of an exemplary radio network configuration that depicts an access point located at a perimeter of a coverage area of the radio network and that broadcasts multiple different directional signals than can be used to trigger a mobile station to perform one or more predetermined actions;

DETAILED DESCRIPTION OF EXEMPLARY EMBODIMENTS

1. Overview

Figure 1:
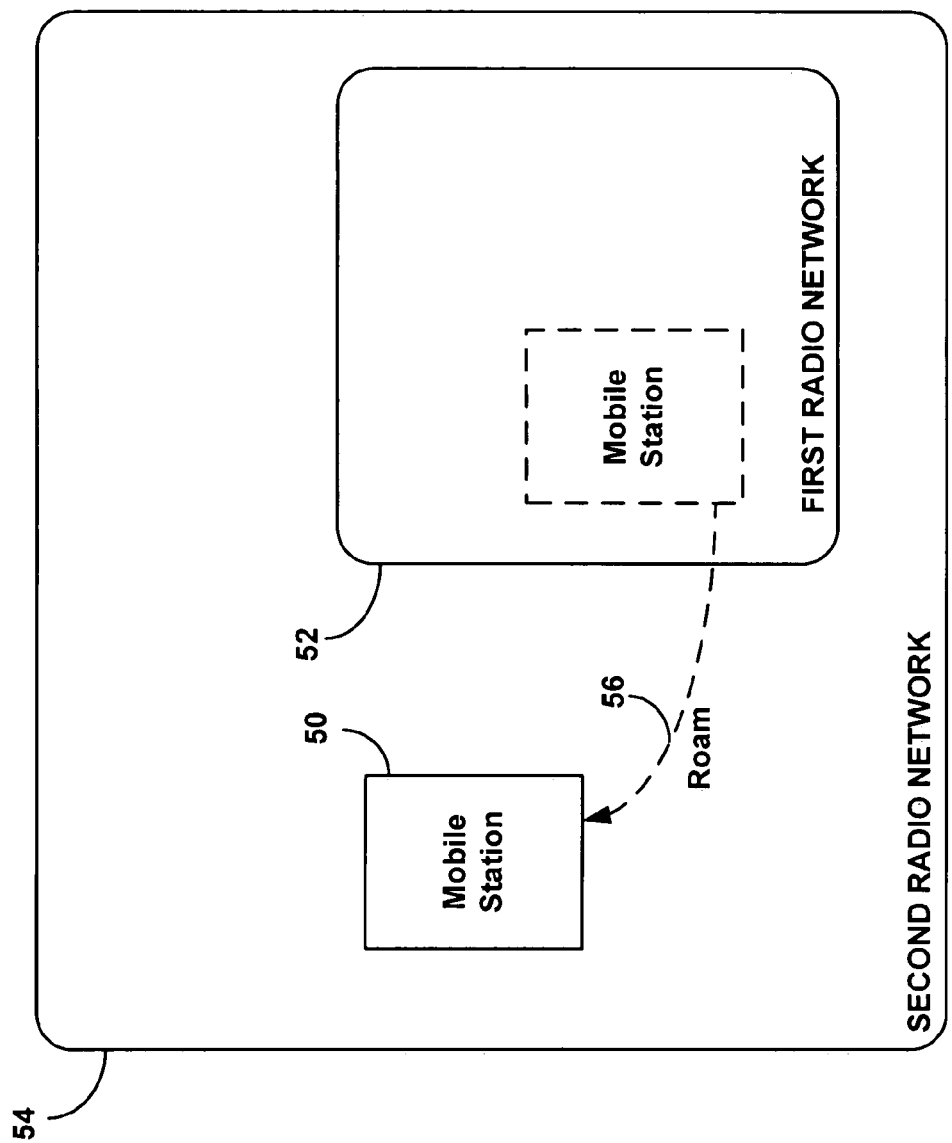
FIG. 1 is an exemplary illustration of a mobile station that can communicate with first and second radio networks.

FIG. 1 is an exemplary illustration of a mobile station 50 that can communicate with a first radio network 52 and a second radio network 54. The mobile station 50 may communicate with other devices on the first or second radio networks 52, 54 in order to exchange voice, data or other types of information. The first and second radio networks 52, 54 may optionally provide connectivity to other networks, thereby also allowing the mobile station 50 to communicate with devices on those other networks. The first and second radio networks 52, 54 may be any types of radio networks. For example, the first radio network 52 may be a WLAN. The second radio network 54 may be, for example, a WWAN. These are merely examples, and any other type of wireless network may be used for the first and second wireless networks 52, 54.

The first radio network 52 may include one or more access points located at the perimeter of the first radio network 52, and it may also include one or more access points located in an interior of the first radio network 52. The access points located at the perimeter of the first radio network 52 may be programmed to transmit information that allows the mobile station 50 to differentiate these access points from the access points located in the interior of the first radio network 52. In response to determining that it is communicating with an access point located at the perimeter of the first radio network 52 rather than communicating with an access point located at the interior of the first radio network 52, the mobile station 50 might perform one or more predetermined actions.

An access point located at the exterior of the first radio network 52 might further transmit two or more different signals, which may be directional signals. For example, the access point might transit one signal toward the interior of the coverage area of the first radio network 52, and the access point might transmit a different signal toward the exterior of the coverage area of the first radio network 52. The mobile station 50 might further use these directional signals as triggers to perform one or more predetermined actions.

For example, the mobile station 50 might be triggered to checking availability of a radio network and to establish a connection with that radio network. Alternatively, the mobile station 50 might be triggered to perform an active session handoff or a seamless service handoff. Still alternatively, the mobile station 50 might be triggered to sound an alarm used to restrict the movement of the mobile station 50 to a predefined area. These are merely examples, and the methods described herein may be used to trigger the mobile station 50 perform a variety of other predetermined actions.

2. Exemplary Architecture

Figure 2:
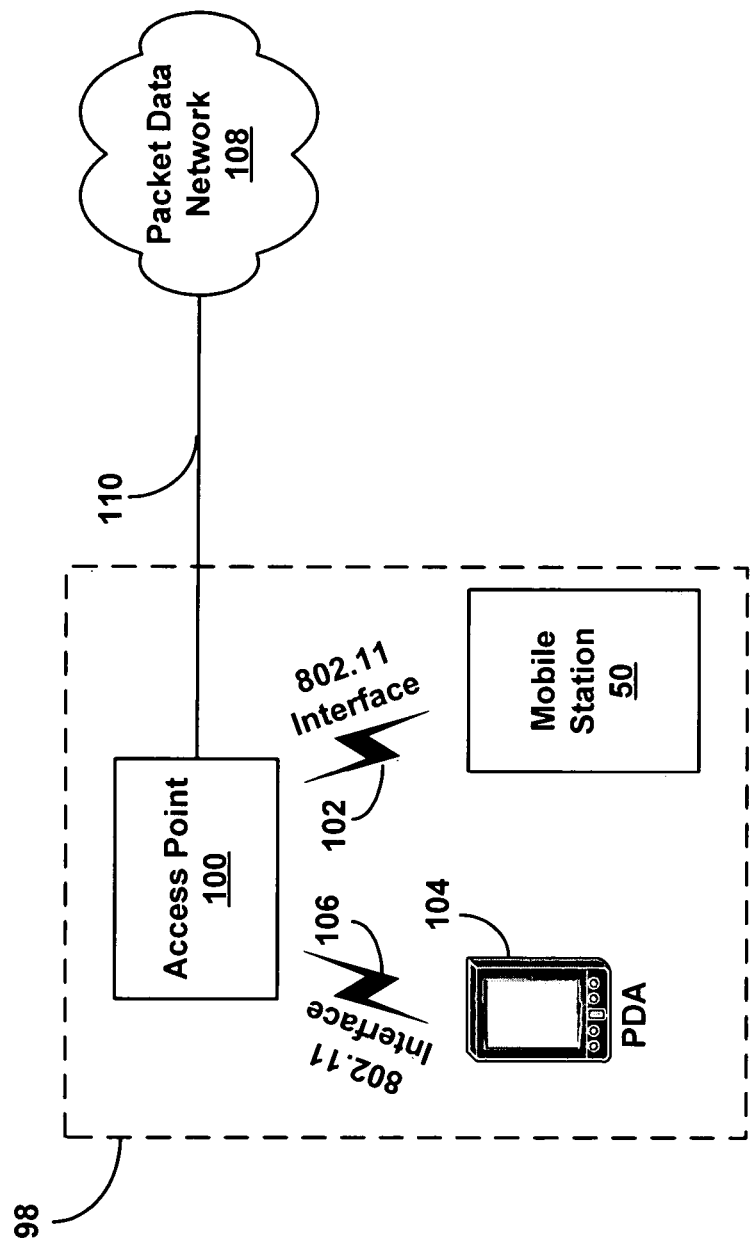
FIG. 2 is an exemplary WLAN that can be used as the first radio network of FIG. 1.

FIG. 2 is an exemplary WLAN that can be used as the first radio network 52 of FIG. 1. The devices on the WLAN 98 may communicate using one or more of the various IEEE 802.11 standards. IEEE 802.11 specifies various signaling and formatting protocols that can be used by devices on the WLAN 98. For example, IEEE 802.11 provides protocols for a physical ("PHY") layer, which is used to transmit bits of information over a wireless interface. IEEE 802.11 also defines a media access control ("MAC") sub-layer, which can be used to format the bits sent over the wireless interfaces using one of the PHY layer protocols.

The WLAN 98 in FIG. 2 is depicted in a basic service set ("BSS") configuration. In the BSS configuration, one or more wireless nodes connect with an access point ("AP") 100. As depicted in FIG. 2, the WLAN 98 includes two wireless nodes. The mobile station 50 serves as one wireless node and communicates with the AP 100 over an 802.11 wireless interface 102. The mobile station 50 and other wireless nodes may be any number of different devices, such as mobile phones, two-way pagers, two-way radios, personal digital assistants, Internet appliances, wirelessly-equipped computers or any other wireless devices.

As depicted in FIG. 2, a personal digital assistant ("PDA") 104 serves as the second wireless node and communicates with the AP 100 over an 802.11 wireless interface 106. Other types of devices may also serve as wireless nodes. Although FIG. 2 only depicts two wireless nodes 50, 104, the WLAN 98 may include a greater or fewer number of wireless nodes.

In the BSS configuration, the wireless nodes 50, 104 can exchange data with each other through the AP 100. For example, the PDA 104 can send messages to the mobile station 50, and those messages may be routed through the AP 100 to the mobile station 50. Similarly, the mobile station 50 may send messages to the PDA 104, and those messages may also be routed through the AP 100 and then to the PDA 104. Other devices communicating with the AP 100 may exchange messages in a similar manner.

In addition to the BSS configuration, multiple APs can be linked together to form an extended services set ("ESS"). Thus, an ESS can include two or more BSSs. The APs can be linked in a variety of different manners, such as through a wired Ethernet connection. Once linked together, wireless nodes communicating with one AP can exchange data with wireless nodes connected to a different AP. Additionally, a wireless node can roam among the different wireless access points in the ESS. Thus, an ESS configuration can extend the range of the WLAN 98 past that of a BSS configuration.

The AP 100 may in turn connect to a packet data network 108 via a data link 110. The data link 110 may be a wired or wireless connection. The packet data network 108 may be any type of packet data network, such as an intranet or the Internet. The packet data network 108 may additionally provide connectivity to one or more other packet data networks. Using the connectivity between the AP 100 and the packet data network 108, the mobile station 50 may communicate with a device on the packet data network 108.

The WLAN 98 depicted in FIG. 2 may use any of the various 802.11 standards. For example, it may use the 802.11a, 802.11b, 802.11g or other standards under the 802.11 umbrella. It should be understood, however, that IEEE 802.11 is merely exemplary in nature. The first radio network 52 may use other radio protocols. For example, the first radio network 52 may alternatively be an IEEE 802.16 network, an IEEE 802.20 network, a HomeRF network, a HiperLAN, a Bluetooth network, a multichannel multipoint distribution services ("MMDS") network, a digital enhanced cordless telecommunications ("DECT") network, a WWAN or another type of radio network.

Figure 3:
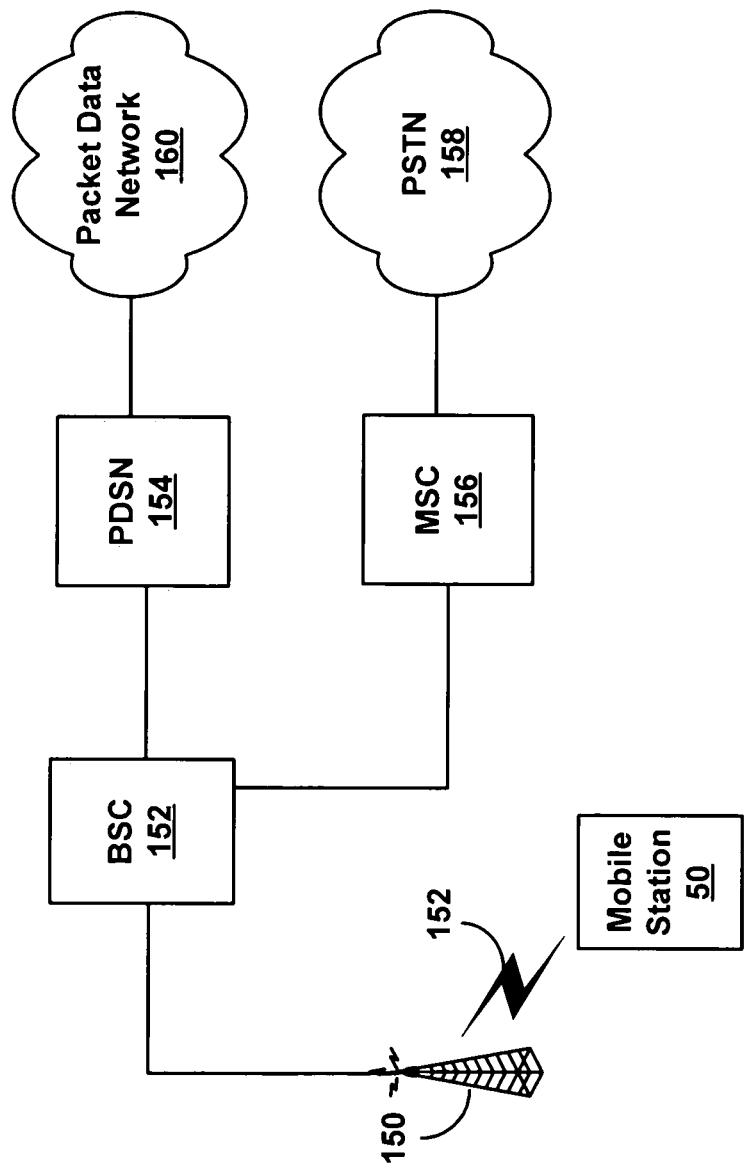
FIG. 3 shows an exemplary architecture for a WWAN that can be used as the second radio network of FIG. 1.

FIG. 3 shows an exemplary architecture for a WWAN that can be used as the second radio network of FIG. 1. As shown in FIG. 3, the mobile station 50 communicates with a base transceiver station ("BTS") 150 via an air interface 152. The mobile station 50 can communicate with the BTS 150 using a variety of different protocols. In one exemplary embodiment, the mobile station 50 communicates with the BTS 150 via the air interface 152 using Code Division Multiple Access ("CDMA").

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other wireless protocols may also be used. For example, the mobile station 50 and the base station 150 may communicate using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), IS-136, Time Division Multiple Access ("TDMA"), IEEE 802.11, Bluetooth, MMDS, DECT, integrated digital enhanced network ("IDEN") or other protocols.

The BTS 150 connects to a base station controller ("BSC") 152, which in turn connects to a packet data serving node ("PDSN") 154. The PDSN 154 connects to a packet data network 160. Using this connectivity, the mobile station 50 may then communicate with devices on the packet data network 160. Alternatively, the mobile station 50 might use an Internetworking Function ("IWF") in order to engage in packet data communications with another device on the WWAN or on the packet data network 160. Depending on the particular type of WWAN, other methods might also be used to provide the mobile station 50 with access to the packet data network 160.

Alternatively, the mobile station 50 may access the WWAN by placing a traditional voice call. The BSC 152 may connect to a mobile switching center ("MSC") 156, which in turn may connect to the public switched telephone network ("PSTN") 158. The mobile station 50 may use this connectivity to form a circuit-switched connection with another device on the PSTN. The mobile station 50 may then send voice traffic to the other device over this connection; however, the mobile station may also send data over this type of connection. Other types of circuit-switched connections may be used.

It should be understood, however, that the wireless networks depicted in FIGS. 2 and 3 are merely exemplary in nature. For example, it is not necessary that the first radio network 52 be a WLAN but might alternatively be any other type of radio network. Also, the second radio network 54 might be a different type of WWAN than depicted in FIG. 3 or might be a wireless network other than a WWAN. Also, it is also not necessary that one particular radio network have a larger coverage area than the other radio network, and the mobile station 50 might alternatively communicate with a greater or fewer number of radio networks than are depicted in FIG. 1.

Figure 4:
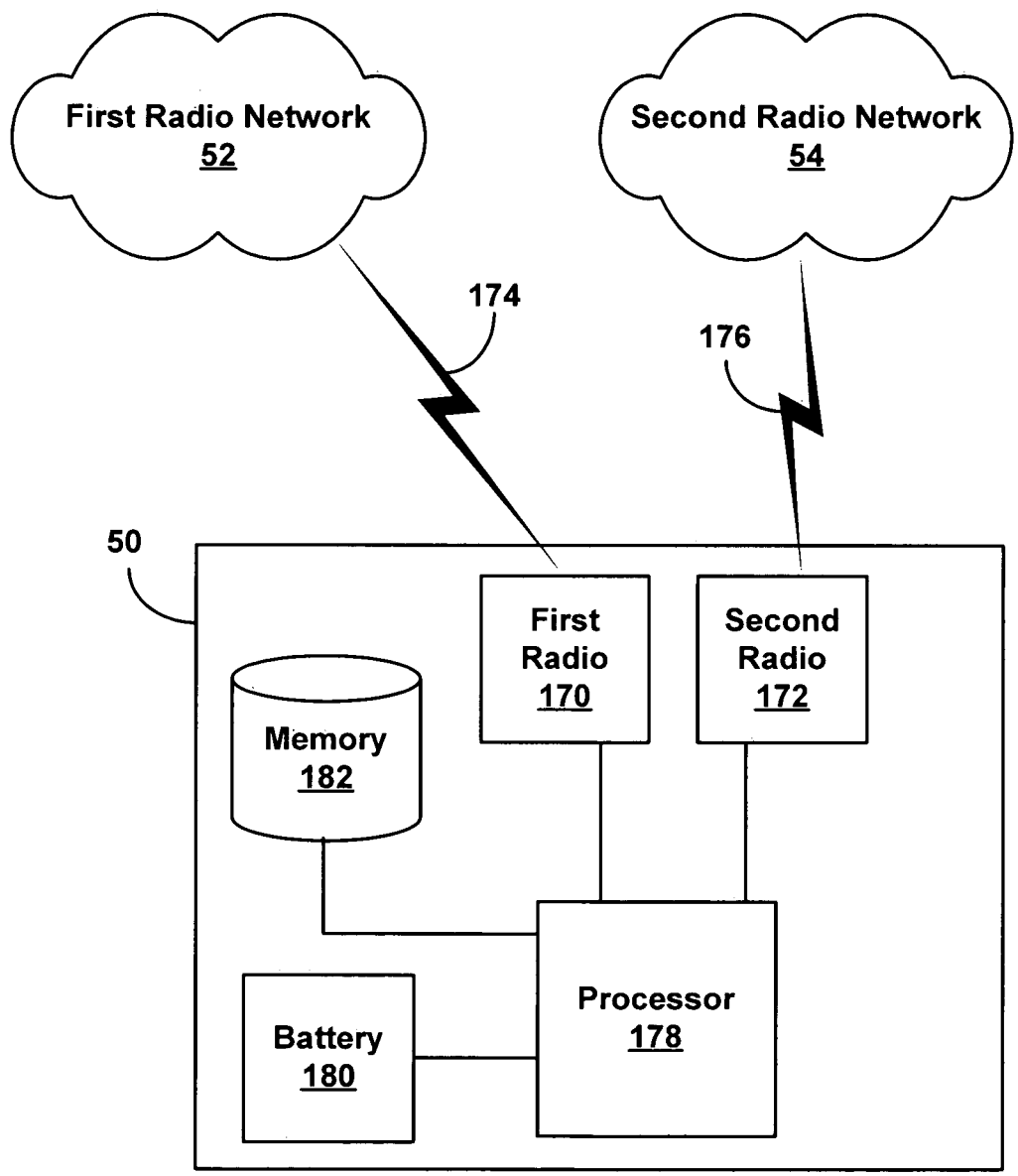
FIG. 4 is a block diagram illustrating exemplary components in the mobile station that can be used to communicate with the first and second radio networks of FIG. 1.

FIG. 4 is a block diagram illustrating exemplary components in the mobile station that can be used to communicate with the first and second radio networks of FIG. 1. As shown in FIG. 4, the mobile station 50 includes a first radio 170 for communicating with the first radio network 52 via a first wireless interface 174. The mobile station 50 also includes a second radio 172 for communicating with the second radio network 54 via a second wireless interface 176. The radios 170, 172 may vary with the types of the first and second radio networks 52, 54.

As previously described, in one exemplary embodiment the first radio network 52 may be a WLAN and the second radio network 54 may be a WWAN. Thus, the first radio 170 may be a WLAN radio, and the second radio 172 may be a WWAN radio. Thus, in one exemplary embodiment, the first wireless interface 174 may be the 802.11 interface 102 of FIG. 2, and the second wireless interface 176 may be the air interface 152 of FIG. 3. However, the particular types of wireless interfaces 174, 176 may vary with the particular types of radio networks.

The radios 170, 172 may be separate components in the mobile station 50. For example, they may be separate application specific integrated circuits ("ASICs"), antenna systems or other separate components. Alternatively, the radios 170, 172 may be integrated into a single ASIC, such as a dual mode ASIC. The radios 170, 172 may also be integrated into a single component in the mobile station 50 other than an ASIC. Although FIG. 4 depicts two radios 170, 172 in the mobile station 50, the mobile station 50 may include a greater or fewer number of radios. Thus, the mobile station 50 may communicate with a greater or fewer number of radio networks.

In one exemplary embodiment, the first radio 170 is a WLAN radio module capable of communicating using the IEEE 802.11 protocol. The mobile station can use the WLAN radio module, for example, to access the WLAN of FIG. 2. In another exemplary embodiment, the second radio 172 is a WWAN radio module capable of communicating using CDMA. Once connected to the mobile station 50, the mobile station 50 can use the WWAN radio module to communicate with the WWAN of FIG. 3. These radio modules are merely exemplary in nature, and the mobile station 50 may include radio modules that can communicate with a variety of other types of radio networks.

The radio modules may connect to the mobile station 50 in a variety of different ways. For example, radio modules may connect to the mobile station 50 through a serial port, a parallel port, a Personal Computer Memory Card International Association ("PCMCIA") slot, a Universal Serial Bus ("USB") port, a SDIO slot, a compact flash slot, a firewire connection or another type of connection. Thus, the radio modules may be removable such that a user of the mobile station 50 can add or remove radio modules in order to change the radio networks with which the mobile station 50 can communicate. Alternatively, the radio modules may be permanently connected to the mobile station 50 such that a user of the mobile station 50 cannot add or remove radio modules.

As illustrated in FIG. 4, a processor 178 connects to the first radio 170 and second radio 172 and may control their operation. The processor 178 may additionally control the operation of other components in the mobile station 50. The processor 178 may further interface with a battery 180, which supplies power to the processor 178 and other components in the mobile station 50. The processor 178 may also connect to memory 182, which can store programs, data or other information used by the processor 178.

In order to conserve battery power, the mobile station 50 may power-down the radios 170, 172 when the mobile station 50 is not communicating with their respective radio networks 52, 54. Even when the radios 170, 172 are included in a single chip, they may be independently powered-up and powered-down. That is, while one radio is powered-up, the other radio might be powered-down. Alternatively, they might both be powered-up or powered-down at the same time.

Figure 5A:
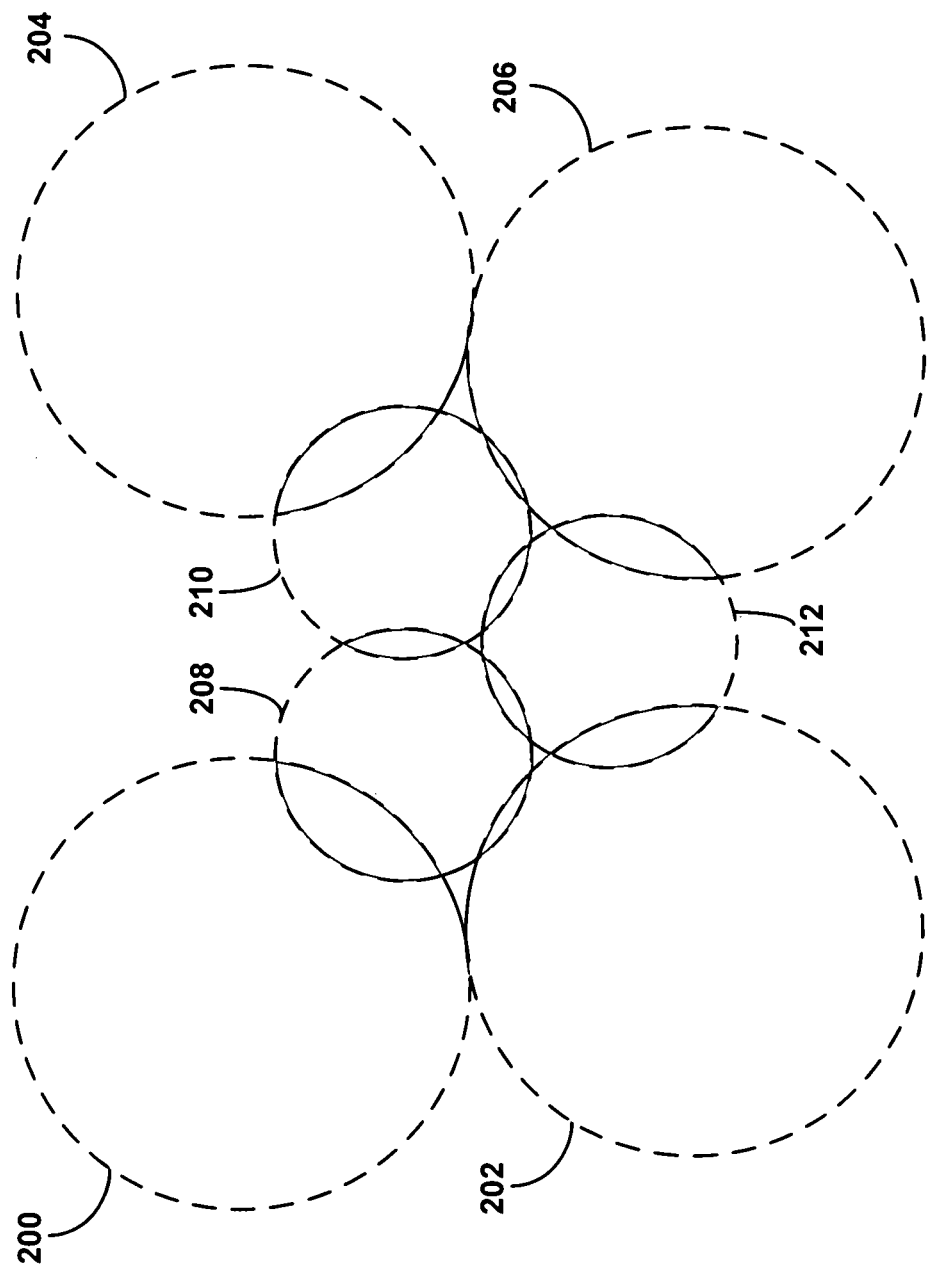
FIGS. 5A-5C are block diagrams of exemplary radio network configurations that depict access points located at a perimeter of a coverage area of a radio network and access points located at an interior of the coverage area of the radio network.
Figure 5B:
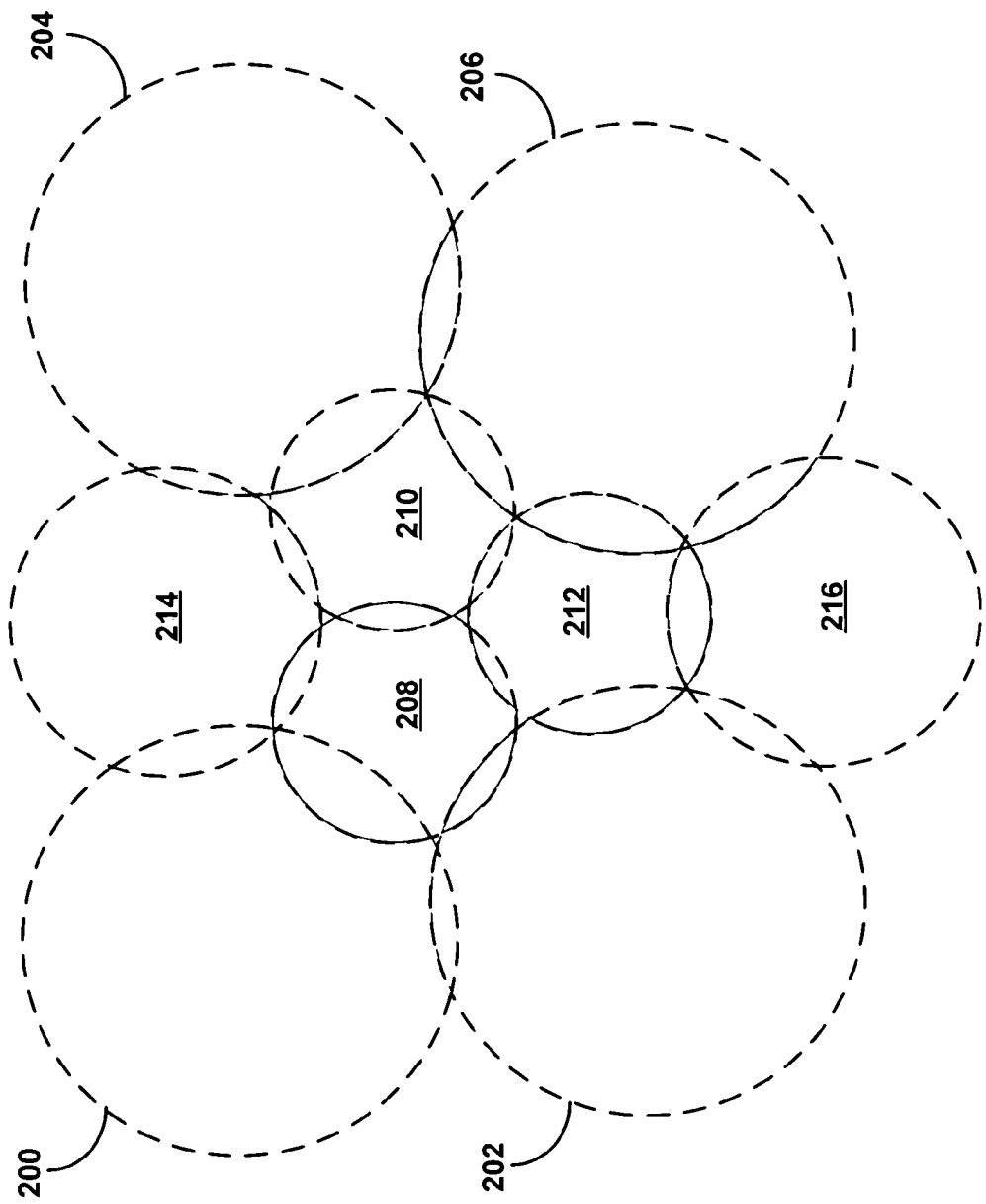
Figure 5C:
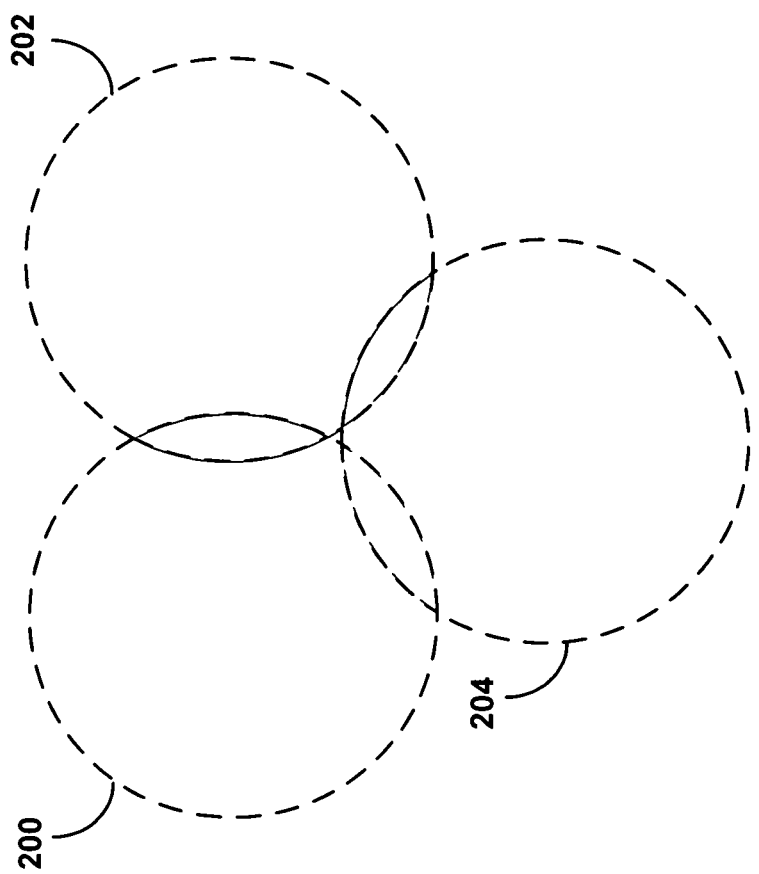

FIGS. 5A-5C are block diagrams of exemplary radio network configurations that depict access points located at a perimeter of a coverage area of a radio network and access points located at an interior of the coverage area of the radio network. These exemplary configurations may be used, for example, as configurations of the access points for the WLAN of FIG. 2.

FIGS. 5A-5C illustrate different access point regions, which combine to form the coverage area of a radio network. Each access point region generally includes an access point, which may provide access to the radio network for devices that are located in that access point region. The access point for an access point region may be located at the center of the access point region, although the access point may optionally be located at other points in the access point region. While FIGS. 5A-5C depict the access point regions as circular regions, in practice the access point regions will generally not be symmetric and will vary in size and shape. It should be understood that the access point regions may vary in size with relation to other, and it is not necessary that any particular access point region be larger or smaller than any other access point region. Also, it should be understood that a particular radio network may include a greater or fewer number of access points regions than are depicted in any of FIGS. 5A-5C.

Turning to FIG. 5A, the exemplary radio network configuration includes seven access point regions: a first exterior access point region 200, a second exterior access point region 202, a third exterior access point region 204, a fourth exterior access point region 206, a first interior access point region 208, a second interior access point region 210 and a third interior access point region 212. Each access point region 200-212 may be served by its own access point, which can serve as a point of connection to the network for mobile station located in that region. For example, when the mobile station 50 is located in the first exterior access point region 200, it would generally access the radio network by communicating with the access point for that access point region 200.

The access points for the radio network are arranged such that some access points are generally located at the perimeter of the coverage area of the radio network, while other access point are generally located at the interior of the coverage area of the radio network. In FIG. 5A, the first, second, third and fourth exterior access point regions 200, 202, 204, 206 are located around the perimeter of the coverage area of the radio network. Thus, the access points for these four access point regions 200, 202, 204, 206 are generally located at the perimeter of the coverage area of the radio network. The first, second and third interior access point regions 208, 210, 212 are located within the interior of the coverage area of the radio network, and therefore, the access points for these three regions 208, 210, 212 are generally located within the interior of the coverage area of the radio network.

In one exemplary embodiment, each individual access point may be designated as either an interior access point or an exterior access point. For example, the signals sent by the access points may include information indicative of whether that access point is located at the perimeter of the coverage area of the radio network or whether that access point is located within the interior of the coverage area of the radio network. A particular access point may then be designated as an interior access point or an exterior access point by configuring the access point to include in its signals the information indicating that it is either an interior access point or an exterior access point.

In this exemplary configuration, the access points for the first, second, third and fourth exterior access point regions 200-206, which are generally located around the perimeter of the coverage area of the radio network, are designated as exterior access points. The access points for the first, second and third interior access point regions 208-212, which are generally located in the interior of the coverage area of the radio network, are designated as interior access points. Therefore, the access points for the exterior access point regions 200-206 are configured to transmit information indicating that they are exterior access points, and the access points for the interior access point regions 208-212 configured to transmit information indicating they are interior access points.

It should be understood, however, that different embodiments may use different designations for the access points depicted in FIG. 5A. In alternate embodiments, one or more of the access points for the exterior access point regions 200-206 may be designated as an interior access point even though that access point is physically located closer to the perimeter of the coverage area of the radio network. In other alternate embodiments, one or more of the access points for the interior access point regions 208-212 may be designated as an exterior access point even though that access point is physically located closer to the interior of the coverage area of the radio network. Thus, while some embodiments may designate access points as interior or exterior access point based primarily on their physical locations, other embodiments may designate access points as interior or exterior access points in a more arbitrary manner.

It should also be understood that the information transmitted by the access points indicating that the access point is an exterior or interior access point may vary depending on the particular embodiment. For example, in some embodiments the signals transmitted by both the interior and exterior access points may include affirmative information indicating the access points are either interior or exterior access points. In other embodiments, the exterior access points may include affirmative information indicating the access point is an exterior access point, while the lack of this information in signals from another access point might indicate that access point is an interior access point. In still other embodiments, the interior access points might transmit the affirmative information, while the exterior access points omit this information. Other methods of differentiating the interior and exterior access points are also possible.

FIG. 5B is an alternate embodiment of the radio network configuration of FIG. 5A. FIG. 5B includes the seven access point regions 200-212 depicted in FIG. 5A. In addition, FIG. 5B includes a fifth exterior access point region 214 and a sixth exterior access point region 216. In this embodiment, all the interior access point regions 208, 210, 212 are fully surrounded by exterior access point regions 200-206, 214-216. Therefore, in this configuration, it would not be possible for the mobile station 50 to transition directly from an interior access point region 208, 210, 212 to a location outside the coverage area of the radio network. In order to leave the coverage area of the radio network, the mobile station in one of the interior access point regions 208-212 would need to move from that interior access point region to one of the exterior access point regions 200-206, 214-216 before moving out of the coverage area of the radio network.

FIG. 5C depicts a radio network configuration where all the access point regions are exterior access point regions. The radio network includes the first, second and third exterior access point regions 200, 202, 204. The three access point regions 200, 202, 204 are configured such that there are no interior access point regions. Thus, as illustrated by FIG. 5C, it is possible to construct a radio network that has only external access point regions. Thus, if the mobile station 50 leaves one of the access point regions but is not moving into another access point region, the mobile station 50 would then be leaving the coverage area of the radio network.

FIG. 5D is a block diagram of an exemplary radio network configuration that depicts an access point located at a perimeter of a coverage area of the radio network and that broadcasts multiple different directional signals than can be used to trigger a mobile station to perform one or more predetermined actions. While FIGS. 5A-5C depict the exterior access points, and hence the exterior access point regions, nearly or totally surrounding the entire coverage area of the wireless network, they do not always need to be configured that way. For example, the radio network may be located within a building or other structure where the mobile station 50 would ordinarily enter through doors or other specific entrance and exit locations. Thus, while the coverage area of the radio network might extend through part or all of the building, the exterior access points might only be positioned at the specific entrance and exit locations.

FIG. 5D generally depicts a building 220 in which a radio network, such as a WLAN, might be located. The coverage area of the WLAN might extend through part or all of the building 220, which may include one or more access points that the mobile station 50 can use to access the WLAN. Thus, when the mobile station 50 is inside the building 220, the mobile station 50 is generally within the coverage area of the WLAN; however, when the mobile station 50 is outside the building 220, the mobile station 50 is generally outside the coverage area of the WLAN.

Another radio network, such as a WWAN, might also provide services to the mobile station 50. The coverage area of the WWAN might generally be outside the building 220 but might optionally extend inside the building as well. Therefore, when the mobile station 50 is outside the building 220, the mobile station 50 might be outside the coverage area of the WLAN but within the coverage area of the WWAN. When the mobile station 50 is inside the building 220, the mobile station 50 might be within the coverage area of both the WWAN and the WLAN.

The building 220 is generally a closed structure with specific entry and exit points. For example, FIG. 5D depicts a door 224 through which the mobile station 50 can enter or exit the building 220. The walls of the building would generally prevent the mobile station 50 from entering or exiting the building at other points. It should be appreciated, however, that the building or some other such structure might be designed in a multitude of different ways. Therefore, a building or other structure might include many different entry and exit points through which the mobile station 50 might enter or exit.

An access point 222 for the WLAN (or any other radio network within the building) may be positioned within proximity to the door 224 such that mobile stations entering or exiting the building 220 through the door 224 can generally detect signals transmitted by the access point 222. While FIG. 5D depicts the access point 222 located within the building 220, the access point 222 might alternatively be located outside the building 220.

The access point 222 may transmit two or more different signals, and the signals may be directional signals. For example, the access point 222 might transmit one signal toward the interior of the building 220 and the other signal toward the exterior of the building 220. Thus, when the mobile station 50 is located within the building 220 and within range of the access point 222, such as near the door 224, the mobile station 50 might be able to detect the signal transmitted toward the interior of the building 220 but at the same time might not be able to detect the signal transmitted toward the exterior of the building 220. Conversely, when the mobile station 50 is located outside the building and within range of the access point 222, such as also near the door 224, the mobile station 50 might be able to detect the signal transmitted toward the exterior of the building 220 but at the same time not detect the signal transmitted toward the interior of the building 220.

The signals transmitted by the access point 222 might be first and second signals that the mobile station 50 can differentiate in order to perform one or more predetermined actions. In one embodiment where the radio network located within the building is a WLAN and where the radio network located outside the building is a WWAN, the access point 222 might transmit WLAN indication signals 226 toward the interior of the building 220 and WWAN indication signals 228 toward the exterior of the building 220. It should be understood, however, that these labels for the signals are merely arbitrary and do not necessarily even have to correspond to the particular types of radio networks.

The access point 222 might transmit the directional signals in a variety of different ways that might depend on the particular protocol used by the access point 222. If the access point 222 uses IEEE 802.11, the access point 222 might embed information in the headers of the directional signals that differentiates the directional signals from each other. The access point 222 might further use one or more directional antennas in order to broadcast the directional signals in their respective directions. In one embodiment, the access point 222 might provide mobile stations with connectivity to the WLAN. In an alternate embodiment, however, the access point 222 might be a standalone device that simply transmits the directional signals but that does not provide mobile stations with connectivity to the WLAN. In yet another embodiment, the access point 222 might actually be two access points—one for transmitting WLAN signals and another for transmitting WWAN signals. Other variations are also possible.

In another embodiment, the access point 222 might transmit the directional signals using Bluetooth. In this case, the access point 222 might use separate Bluetooth transmitters to transmit the directional signals. The Bluetooth transmitters might further use one or more directional antennas in order to transmit the directional signals in their respective directions. In one embodiment, one or both of the Bluetooth transmitters might be in the access point 222, which in turn provides mobile stations with connectivity to the WLAN or to some other radio network. In alternate embodiments, the Bluetooth transmitters might be in standalone devices that do not provide mobile stations with connectivity to the WLAN or to some other radio network.

The access point 222 might transmit the Bluetooth signals using low power and thereby limiting the range of the Bluetooth signals. In one preferred embodiment, the Bluetooth signals are limited to a range of approximately 5-6 feet so as to only trigger mobile stations within close proximity to the door 224 (or to some other location of the access point 222) to perform one or more predetermined actions. In alternate embodiments, the Bluetooth signals might have a range that is greater or less than approximately 5-6 feet. In embodiments where the access point 222 uses protocols other than Bluetooth to transmit the signals, the access point 222 might similarly limit the signals' ranges to a predetermined distance.

The WLAN and WWAN indication signals 226, 228 can be used in various different ways to trigger the mobile station 50 to perform one or more predetermined actions. In one embodiment, the mobile station 50 might be inside the building 220 and currently communicating with the WLAN. The mobile station 50 might then roam to a location inside the building 220 that is within proximity to the door 224 such that the mobile station now detects the WLAN indication signals 226. In response to detecting the WLAN indication signals 226, the mobile station 50 might then perform one or more predetermined actions.

For example, in response to detecting the WLAN indication signal 226, the mobile station 50 might check the availability of the WWAN. That is, the WLAN indication signal 226 might indicate that the mobile station 50 is leaving the coverage area of the WLAN and should attempt to establish a connection with the WWAN. If the mobile station 50 then moves outside the coverage area of the WLAN, the mobile station 50 can use its pre-established connection with the WWAN to maintain continual connectivity. However, if the mobile station 50 moves back within the WLAN, for example when the mobile station 50 no longer detects the WLAN 226 indication and also does not detect the WWAN indication signal 228, the mobile station 50 might terminate its connection with the WWAN.

In another embodiment, the mobile station 50 might not perform the predetermined action after detecting the WLAN indication signal 226 but might only perform the predetermined action after also detecting the WWAN indication signal 228. For example, the mobile station 50 might be inside the building 220 and move to a location where the mobile station detects the WLAN indication signal 226. The mobile station 50 might thereafter move outside the building so that the mobile station 50 then detects the WWAN indication signal 228. In response to detecting the WWAN indication signal 228, the mobile station 50 might then perform one or more predetermined actions.

If the mobile station 50 then moves back inside the building 220 such that the mobile station 50 no longer detects the WLAN indication signal 226 and also does not detect the WWAN indication signal 228, then the mobile station 50 would not perform any predetermined action. This embodiment might be used to trigger the mobile station 50 to only perform a predetermined action after the mobile station 50 has actually left the building 220. As the coverage area of the WLAN might extend slightly outside the building 220, however, the mobile station 50 might still have time to switch to the WWAN before losing connectivity with the WLAN.

Still alternatively, the mobile station 50 might use the WWAN indication signal 228 as the sole factor in determining whether to perform a predetermined action. For example, if the mobile station 50 detects the WWAN indication signal 228, the mobile station 50 might determine that it is moving outside the coverage area of the WLAN and might then perform some predetermined action, such as checking the availability of the WWAN, performing a handoff, sounding an alarm or some other action.

The WLAN and WWAN indication signals 226, 228 might similarly be used to trigger the mobile station 50 to perform one or more predetermined actions as the mobile station 50 moves into the coverage area of the WLAN. For example, the mobile station 50 might be outside the building 220 and therefore also outside the range of the WLAN. The mobile station 50 might further be communicating with the WWAN although not necessarily so. As the mobile station 50 moves into the building 220, the mobile station 50 might first detect the WWAN indication signal 228 and then the WLAN indication signal 226. In response to detecting one or both of these signals, the mobile station 50 might then perform a predetermined action, such as checking the availability of the WLAN.

In one embodiment, the mobile station 50 might include a Bluetooth transceiver that the mobile station 50 continually keeps powered-up. For example, the mobile station 50 might be communicating with the WWAN and therefore might have its WWAN radio powered-up. The mobile station 50 might not be communicating with the WLAN and therefore might have its WLAN radio powered-down. However, the mobile station 50 might continually leave its Bluetooth transceiver powered-up in order to detect the WLAN and WWAN indication signals 226, 228 and to responsively perform an action.

As Bluetooth typically uses low power, continually leaving on the Bluetooth transceiver would consume significantly less power than continually leaving on the WLAN radio. In response to detecting one or both of the WLAN and WWAN indication signals 226, 228, the mobile station 50 might be triggered to check the availability of the WLAN. The mobile station 50 can then power-up its WLAN radio and, if it is available, begin communicating with the WLAN. Therefore, the WLAN and WWAN indication signals 226, 228 might be used to trigger the mobile station 50 to switch from a WWAN to a WLAN, and they might also be used to switch from a WLAN to a WWAN.

In alternate embodiments, access points that transmit the directional signals might be positioned at locations other than the entrances or exits of a building. Also, the coverage areas of the WLAN, WWAN or some other radio network do not necessarily have to be within a building or other confined structure. Further, it is not necessary that the access points that transmit the directional signal be located at the perimeter of the coverage area of a radio network. Rather, the access points for the radio network might be arbitrarily divided into a first group of access points and a second group of access points. Access points in the first group might transmit the directional signals, while access points in the second group might not transmit the directional signals.

3. Exemplary Operation

Figure 6:
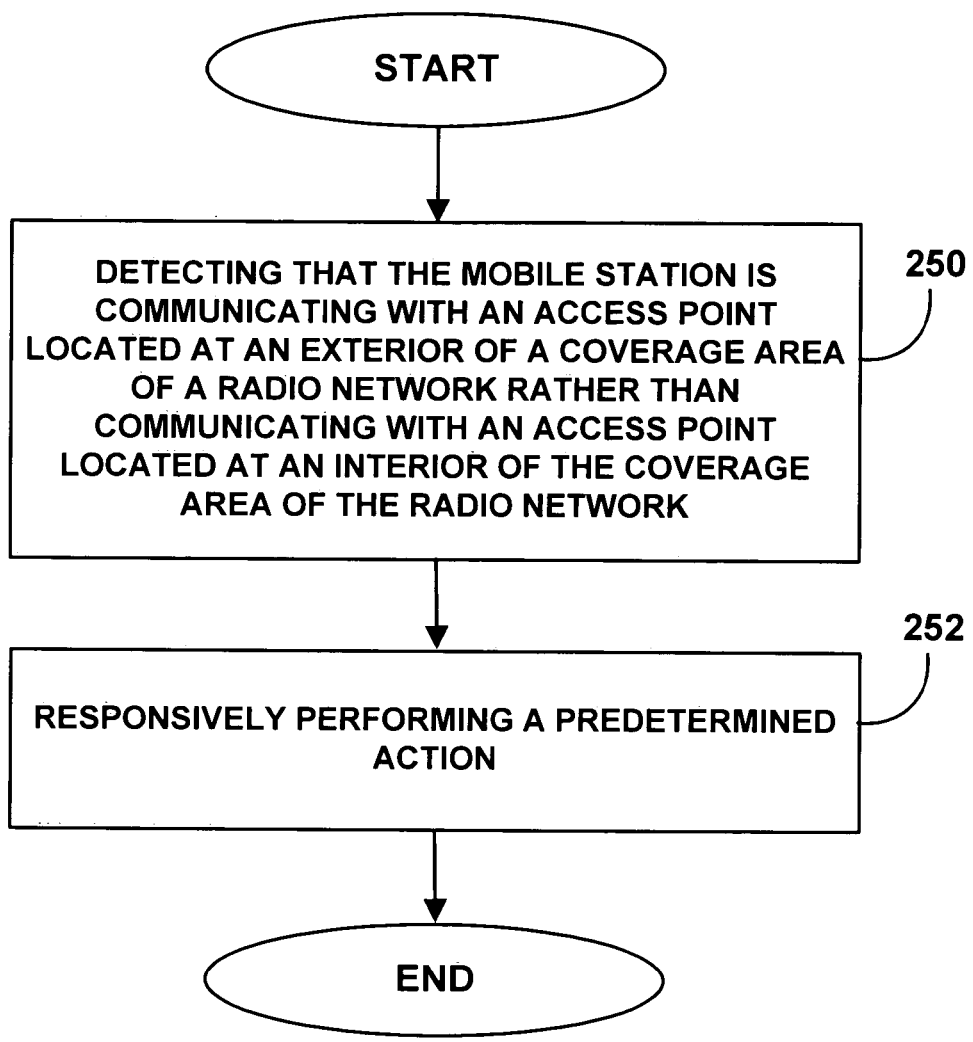
FIG. 6 is a flowchart of an exemplary process that can be used for triggering a mobile station to perform a predetermined action.

FIG. 6 is a flowchart of an exemplary process that can be used for triggering a mobile station to perform a predetermined action. At Step 250, the mobile station detects that it is communicating with an access point located at an exterior of a coverage area of a radio network rather than communicating with an access point located at an interior of the coverage area of the radio network. At Step 252, the mobile station responsively performs the predetermined action.

Figure 7:
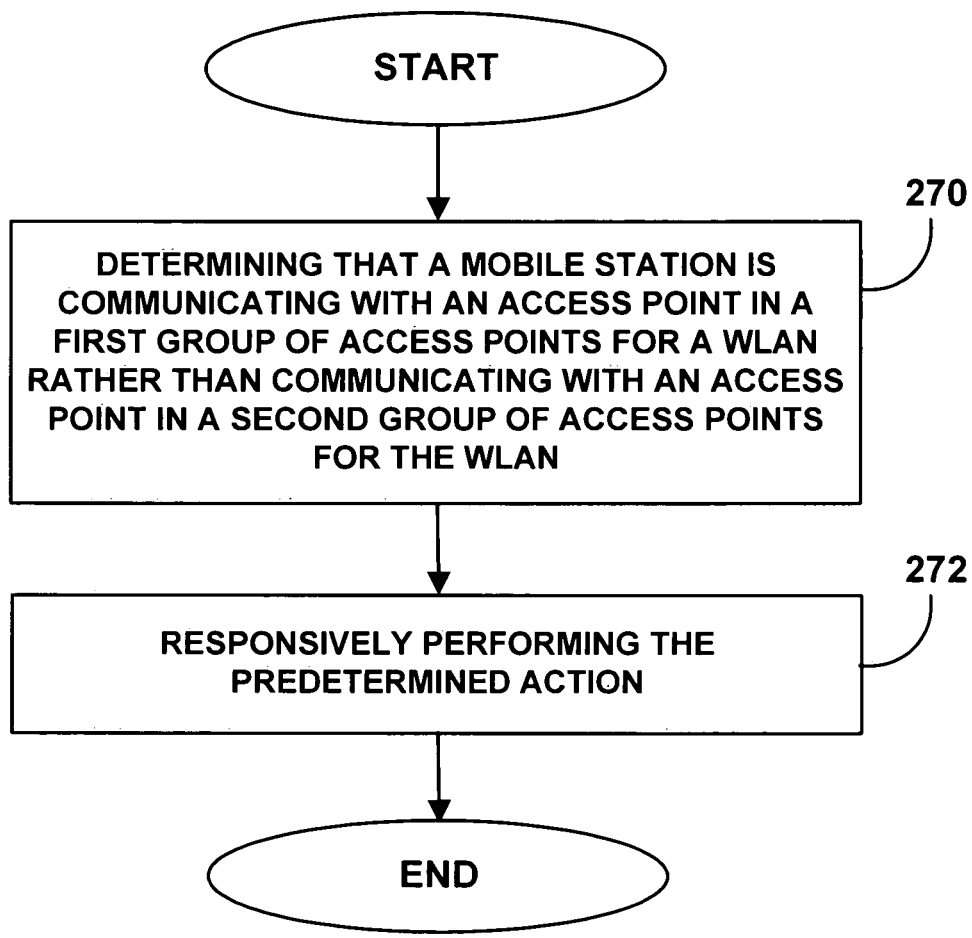
FIG. 7 is a flowchart of an exemplary alternate process that can be used for triggering a mobile station to perform a predetermined action.

FIG. 7 is a flowchart of an exemplary alternate process that can be used for trigger a mobile station to perform a predetermined action. At Step 270, the mobile station determines that it is communicating in an access point in a first group of access points for a WLAN rather than communicating with an access point in a second group of access points for the WLAN. At Step 272, the mobile station responsively performs the predetermined action.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A system for a perimeter between a wireless local area network (WLAN) and a wireless wide area network (WWAN), wherein the WLAN provides a WLAN coverage area that includes an interior of a building and the WWAN provides a WWAN coverage area that includes an exterior of the building, said system comprising:
   an access point, located within the building, for providing mobile stations with connectivity to the WLAN within the WLAN coverage area;
   wherein the access point located within the building is configured to transmit a first directional signal toward the interior of the building, the first directional signal including first information using a wireless protocol, wherein the wireless protocol is Bluetooth or IEEE 802.11;
   wherein the access point located within the building is further configured to transmit a second directional signal toward the exterior of the building, the second directional signal including second information using the wireless protocol, the first and second information differentiating the first and second directional signals from each other; and
   wherein the access point is positioned within proximity to a door of the building such that a mobile station entering or exiting the building through the door can sequentially detect the first and second directional signals and responsively perform a handoff between the WLAN and the WWAN.

2. A method for triggering a mobile station to perform a predetermined action, the mobile station being able to communicate with a first radio network and a second radio network, wherein the first radio network provides coverage inside of a building and the second radio network provides coverage outside of the building, the method comprising:
   the mobile station moving into range of an access point of the first radio network, wherein the access point is located within the building, the access point transmitting a first indication signal toward an interior of the building and a second indication signal toward an exterior of the building, wherein the first indication signal includes first information using a wireless protocol and the second indication signal includes second information using the wireless protocol, the first and second information differentiating the first and second indication signals from each other and indicating that the access point is located at a perimeter of the first radio network, wherein the access point is positioned within proximity to a door of the building such that mobile stations entering or exiting the building through the door can detect the first and second indication signals, and wherein the wireless protocol is Bluetooth or IEEE 802.11; the mobile station sequentially detecting the first and second indication signals; and
   the mobile station responsively performing the predetermined action, wherein the predetermined action comprises a handoff between the first and second radio networks.

3. The method of claim 2, wherein the mobile station sequentially detecting the first and second indication signals comprises:
   the mobile station detecting the first indication signal and, thereafter, detecting the second indication signal.

4. The method of claim 3, wherein the mobile station moving into range of an access point of the first radio network comprises: the mobile station moving into range of the access point from inside the building.

5. The method of claim 2, wherein the mobile station sequentially detecting the first and second indication signals comprises:
   the mobile station detecting the second indication signal and, thereafter, detecting the first indication signal.

6. The method of claim 5, wherein the mobile station moving into range of an access point of the first radio network comprises: the mobile station moving into range of the access point from outside the building.

7. The method of claim 2, wherein the first radio network is a wireless local area network (WLAN) and the second radio network is a wireless wide area network (WWAN).

8. The method of claim 2, wherein the first and second indication signals are directional signals.

9. The method of claim 2, wherein the wireless protocol is Bluetooth.

10. The method of claim 2, wherein the wireless protocol is IEEE 802.11.

* * * * *